United States Patent
Xu et al.

(10) Patent No.: US 12,129,370 B2
(45) Date of Patent: *Oct. 29, 2024

(54) RUBBER COMPOSITION, PROCESSING METHOD THEREOF, AND RUBBER BELT AND RUBBER ROLLER USING THE SAME

(71) Applicants: HANGZHOU XINGLU TECHNOLOGIES CO., LTD, Zhejinag (CN); ZHEJIANG UNIVERSITY, Zhejiang (CN)

(72) Inventors: Tao Xu, Hangzhou (CN); Zhi Sheng Fu, Hangzhou (CN); An Yang Wu, Hangzhou (CN)

(73) Assignees: HANGZHOU XINGLU TECHNOLOGY CO., LTD., Zhejiang (CN); ZHEJIANG UNIVERSITY, Zhejiang (CN)

( * ) Notice: Subject to any disclaimer, the term of this patent is extended or adjusted under 35 U.S.C. 154(b) by 109 days.

This patent is subject to a terminal disclaimer.

(21) Appl. No.: 16/477,525

(22) PCT Filed: Jan. 12, 2018

(86) PCT No.: PCT/CN2018/072353
§ 371 (c)(1),
(2) Date: Jul. 12, 2019

(87) PCT Pub. No.: WO2018/130188
PCT Pub. Date: Jul. 19, 2018

(65) Prior Publication Data
US 2019/0359810 A1    Nov. 28, 2019

(30) Foreign Application Priority Data

Jan. 13, 2017  (CN) .......................... 201710024698.4
Jan. 10, 2018  (CN) .......................... 201810020822.4

(51) Int. Cl.
| | |
|---|---|
| *C08L 23/16* | (2006.01) |
| *B65G 15/32* | (2006.01) |
| *C08K 3/013* | (2018.01) |
| *C08K 5/00* | (2006.01) |
| *C08L 23/06* | (2006.01) |
| *C08L 23/08* | (2006.01) |

(52) U.S. Cl.
CPC .............. *C08L 23/16* (2013.01); *B65G 15/32* (2013.01); *C08K 3/013* (2018.01); *C08K 5/0016* (2013.01); *C08K 5/0025* (2013.01); *C08L 23/06* (2013.01); *C08L 23/08* (2013.01)

(58) Field of Classification Search
CPC .......... C08L 23/08; C08L 23/16; C08L 23/06; C08L 23/04; C08L 91/00; C08L 71/02; C08K 5/0016; C08K 3/22; C08K 3/346; C08K 5/0025; C08K 3/013; C08K 5/34924; C08K 5/14; C08K 3/04; C08K 3/011; C08K 5/005; C08K 3/06; C08K 3/26; C08K 5/09; C08K 2003/265; C08K 2003/2217; C08K 2003/2206; C08K 2003/2296; C08K 2003/222; C08K 2201/014

See application file for complete search history.

(56) References Cited

U.S. PATENT DOCUMENTS

| | | | | |
|---|---|---|---|---|
| 4,100,182 | A * | 7/1978 | Martin ............... | A63B 37/0003 534/10 |
| 4,871,004 | A * | 10/1989 | Brown ............... | B60C 15/0607 152/209.4 |
| 6,103,658 | A | 8/2000 | Mackenzie et al. | |
| 6,455,616 | B1 * | 9/2002 | Cogen .................. | C08K 5/14 524/100 |
| 6,660,677 | B1 | 12/2003 | Mackenzie et al. | |
| 11,242,450 | B2 * | 2/2022 | Xu ....................... | C08K 3/013 |
| 11,479,661 | B2 * | 10/2022 | Xu ....................... | E01D 19/041 |
| 11,634,566 | B2 * | 4/2023 | Xu ....................... | B60C 1/0016 525/515 |
| 2005/0037882 | A1 | 2/2005 | Hineno et al. | |
| 2007/0249452 | A1 * | 10/2007 | South .................. | F16G 1/28 474/263 |
| 2009/0223783 | A1 * | 9/2009 | Herold ................ | B65G 15/30 198/844.2 |

FOREIGN PATENT DOCUMENTS

| | | | |
|---|---|---|---|
| CN | 1109830 | C * | 5/2003 |
| CN | 1572830 | A | 2/2005 |
| CN | 1970280 | A | 5/2007 |
| CN | 101028888 | A | 9/2007 |

(Continued)

OTHER PUBLICATIONS

SIPO, International Search Report issued in IA Application No. PCT/CN2018/072353, mailed Mar. 27, 2018.

*Primary Examiner* — Marc S Zimmer
*Assistant Examiner* — Jeffrey S Lenihan
(74) *Attorney, Agent, or Firm* — LKGlobal | Lorenz and Kopf, LLP

(57) ABSTRACT

A rubber composition is disclosed and comprises a rubber matrix and essential components. The rubber matrix comprises, based on 100 parts by weight of the rubber matrix, A parts of a branched polyethylene, wherein 0<A<100 parts, and B parts of an EPM and an EPDM, wherein 0<B<100 parts. The essential components comprise, based on 100 parts by weight of the rubber matrix, 1.5-9 parts of a crosslinking agent, and 5-60 parts of a staple fiber. The branched polyethylene comprises an ethylene homopolymer having a degree of branching of from 60 to 105 branches/1000 carbon atoms, a weight average molecular weight of from 268,000 to 518,000, and a Mooney viscosity ML (1+4) at 125° C. of from 42 to 102.

19 Claims, No Drawings

(56) References Cited

FOREIGN PATENT DOCUMENTS

| | | | | |
|---|---|---|---|---|
| CN | 101531725 | A | | 9/2009 |
| CN | 101812145 | A | | 8/2010 |
| CN | 102297239 | A | | 12/2011 |
| CN | 102827312 | A | | 12/2012 |
| CN | 103980596 | A | * | 8/2014 |
| CN | 104926962 | A | | 9/2015 |
| CN | 105622803 | A | | 6/2016 |
| CN | 107556577 | A | * | 1/2018 |
| EP | 2650327 | A1 | * | 10/2013 |
| WO | 0157101 | A1 | | 8/2001 |

* cited by examiner

RUBBER COMPOSITION, PROCESSING METHOD THEREOF, AND RUBBER BELT AND RUBBER ROLLER USING THE SAME

CROSS REFERENCE TO RELATED APPLICATIONS

The present application is the U.S. national phase of and claims priority to International Patent Application No. PCT/CN2018/072353 filed Jan. 12, 2018, which claims the benefit of priority from China National application Ser. No. 20/171,0024698.4, filed on Jan. 13, 2017 and China National application Ser. No. 20/181,0020822.4, filed on Jan. 10, 2018, the entire content of each of which is incorporated herein by reference into the present disclosure as if fully set forth herein.

TECHNICAL FIELD

The present invention relates to the technical field of rubbers, in particular to a staple fiber reinforced rubber composition, a processing method thereof, and a rubber belt and rubber roller using the rubber composition and production methods thereof.

BACKGROUND

With the rapid development of the automotive industry, the transmission system in the automotive engine room is becoming more and more compact, and the temperature in the automotive engine room is becoming higher and higher. The ambient temperature in some automotive engine rooms can even reach 150° C., causing that the traditional chloroprene rubber (CR) transmission belt and other products fail to meet the requirements. Hydrogenated nitrile butadiene rubber (HNBR) is expensive and is mainly used for timing belts of high requirements and oilfield-dedicated transmission belts that require oil and ozone resistance. Ethylene-propylene rubber has a moderate cost, a fully saturated molecular backbone, and excellent heat resistance. It has become a trend to replace chloroprene rubber with ethylene-propylene rubber in power transmission belts. However, compared with chloroprene rubber, the mechanical strength of ethylene-propylene rubber is obviously inferior and cannot be applied to occasions requiring higher mechanical strength.

In order to meet the high temperature resistance requirement, the rubber compound is partially or fully an ethylene-propylene rubber of high heat resistance in various portions (especially the cover layer in direct contact with the material) of the conveyor belts used in high-temperature environments.

Ethylene-propylene rubber is also used in the area of heat-resistant rubber rollers.

In general, ethylene-propylene rubber becomes more and more popular in staple fiber reinforced high-temperature resistant conveyor belts, high-temperature resistant transmission belts and high-temperature resistant rubber rollers due to its good heat-aging resistance. Sulfur vulcanization and peroxide vulcanization are the two most commonly used vulcanization systems for ethylene-propylene rubber. However, in order to obtain better high-temperature resistance, peroxide vulcanization is often used. However, the peroxide-vulcanized ethylene-propylene rubber has a weaker mechanical strength than that of the sulfur-vulcanized ethylene-propylene rubber, and is relatively easy to be damaged during the production and use of the product. How to further improve the aging resistance and mechanical properties of ethylene-propylene rubber is a problem.

Ethylene-propylene rubbers are a kind of synthetic rubbers with a saturated molecular backbone, and include ethylene-propylene monomer (EPM) and ethylene-propylene-diene monomer (EPDM), both of which have good aging resistance. EPDM is commonly used in the ethylene-propylene rubber products. However, since EPDM contains a third monomer with a molecular chain having a double bond and EPM has a completely saturated molecular chain, EPM has more excellent aging resistance. Therefore, in a situation where a higher requirement is raised for the aging resistance, it is a common technical solution to use EPM in combination to improve the aging resistance of EPDM. However, the mechanical strength of EPM is low, which affects the overall physical and mechanical properties.

EPM is a copolymer of ethylene and propylene, which is a copolymer of ethylene and an $\alpha$-olefin. The copolymer of ethylene and an $\alpha$-olefin is a polymer containing only carbon and hydrogen elements and having a saturated molecular chain. The common types of carbon atoms found in such polymers generally include primary, secondary and tertiary carbons, in which the tertiary carbon is most susceptible to hydrogen abstraction to form a free radical. Accordingly, the proportion of tertiary carbon atoms in all carbon atoms is generally considered to be a major factor affecting the aging resistance of ethylene/$\alpha$-olefin copolymers. The lower the proportion is, the better the aging resistance will be. The proportion can be expressed by the degree of branching. For example, EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. EPM usually has an ethylene content of 40-65% or 40-60% by weight, so the degree of branching is generally in the range of 117-200 branches/1000 carbon atoms or 133-200 branches/1000 carbon atoms. This degree of branching is considered to be higher than that of other common ethylene/$\alpha$-olefin copolymers.

In the prior art, the $\alpha$-olefin in the common ethylene/$\alpha$-olefin copolymers may include, in addition to propylene, an $\alpha$-olefin having a carbon number of not less than 4, which may be selected from a $C_4$-$C_{20}$ $\alpha$-olefin, and is generally selected from 1-butene, 1-hexene and 1-octene. If the degree of branching of an ethylene/$\alpha$-olefin copolymer is too low, the melting point and crystallinity are too high, so it is not suitable for use as a rubber component. If the degree of branching is too high, the content of $\alpha$-olefin is high, which leads to a higher process difficulty and raw material cost, and a lower operability and economical efficiency. In the prior art, a polyolefin obtained by copolymerizing ethylene with 1-butene or ethylene with 1-octene can be referred to as a polyolefin plastomer or a polyolefin elastomer according to the magnitudes of crystallinity and melting point. Due to their proper crystallinity and melting point, some polyolefin elastomer brands can be well used in combination with an ethylene-propylene rubber and have a low degree of branching, so they are considered to be an ideal material for improving the aging resistance of ethylene-propylene rubbers, and can be used in place of ethylene-propylene rubbers to some extent. Since an ethylene/1-octene copolymer has more flexible molecular chain, higher rubber elasticity, and better mechanical performance than an ethylene/1-butene copolymer, the polyolefin elastomer commonly used in rubber products is generally a copolymer of ethylene and 1-octene at present, in which the octene content in percentages by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of EPM. Therefore, the ethylene/1-octene copolymer has excellent aging resistance and good physical and mechanical properties.

Rubbers are usually used after cross-linking. Among common cross-linking methods for ethylene-propylene rubbers, peroxide cross-linking or radiation cross-linking can be suitably used for a copolymer of ethylene and an α-olefin, both of which mainly comprising: forming a tertiary carbon radical by hydrogen abstraction from a tertiary carbon and then creating a carbon-carbon crosslink by free radical bonding. However, an ethylene/1-octene copolymer (hereinafter referred to as POE) has a low number of tertiary carbon atoms and has a longer branch attached to the tertiary carbon atom, so the steric hindrance is large, and the free radical reaction is difficult to occur, resulting in difficulty in crosslinking, thus affecting the processing efficiency and product performance.

Therefore, there is currently a need for a better technical solution, which can improve the aging resistance of ethylene-propylene rubbers while the rubber composition has good physical and mechanical properties and cross-linking performances, and is expected to behave well with respect to particular functional performances of rubber products (for example, compression set resistance and so on).

SUMMARY

In view of the problems existing in the prior art, the present invention provides a rubber composition, use thereof in power transmission belts, conveyor belts, rubber hoses, and robber rollers, and a production method thereof. Branched polyethylene with a degree of branching of not less than 50 branches/1000 carbon atoms is used to replace a part or all of the ethylene-propylene rubber, to overcome the defects and disadvantages existing in the prior art.

The rubber matrix of the rubber composition of the present invention may be composed entirely of branched polyethylene, or may be composed of branched polyethylene and EPM, branched polyethylene and EPDM, and branched polyethylene, EPM and EPDM. The combination of branched polyethylene and EPM can improve the mechanical properties and processing performances of EPM. The combination of branched polyethylene and EPDM can improve the heat and aging resistances and mechanical properties of EPDM. A small amount of a diene present in EPDM functions as an intrinsic auxiliary cross-linking agent in the peroxide vulcanization. This significantly reduces the amount of an auxiliary crosslinking agent needed and the cost when it is added.

To achieve the above object, a technical solution of the present invention relates to a rubber composition, which comprise a rubber matrix and essential components. The rubber matrix comprises, in parts by weight, a branched polyethylene with a content represented as A, in which $0 < A \leq 100$ parts, and an EPM and an EPDM with a total content represented as B, in which $0 \leq B < 100$ parts; and based on 100 parts by weight of the rubber matrix, the essential components comprise 1.5-9 parts of a crosslinking agent, and 5-60 parts of a staple fiber, in which the branched polyethylene has a degree of branching of not less than 50 branches/1000 carbon atoms, a weight average molecular weight of not less than 50,000, and a Mooney viscosity ML (1+4) at 125° C. of not less than 2.

In the prior art, "branched polyethylene" refers to, in addition to an ethylene homopolymer having branches, a saturated vinyl copolymer having branches, for example, an ethylene-α-olefin copolymer, which may be POE. Although POE performs well in physical and mechanical properties and aging resistance, the cross-linking performances are less good. Therefore, although the branched polyethylene of the present invention can include both a branched ethylene homopolymer and POE, it is preferred that the branched polyethylene comprises a high proportion of or exclusively a branched ethylene homopolymer. In a preferred embodiment of the present invention, the branched polyethylene comprises exclusively a branched ethylene homopolymer.

In the further elaboration of the technical solution of the present invention, the branched polyethylene used is a branched ethylene homopolymer unless otherwise particularly specified.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method comprises mainly homopolymerizing ethylene following a "chain walking mechanism" in the presence of a late transition metal catalyst, where the late transition metal catalyst is preferably an (α-diimine)nickel/palladium catalyst. The nature of the chain walking mechanism refers to the fact that a β-hydrogen elimination reaction and a re-insertion reaction tend to occur in the polymerization of an olefin in the presence of a late transition metal catalyst, for example, an (α-diimine)nickel/palladium catalyst, thereby causing branching. The branches pendant to the backbone of such branched polyethylene may have different numbers of carbon atoms, and specifically 1 to 6 or more carbon atoms.

The production cost of an (α-diimine) nickel catalyst is significantly lower than that of an (α-diimine) palladium catalyst, and the (α-diimine) nickel catalyst has a high rate and high activity in catalyzing the polymerization of ethylene, and is thus more suitable for industrial application. Therefore, in the present invention, an (α-diimine) nickel catalyst is preferably used in the production of branched polyethylene through catalytic polymerization of ethylene.

The degree of branching of the branched polyethylene used in the present invention is preferably 50 to 130 branches/1000 carbon atoms, further preferably 60 to 130 branches/1000 carbon atoms, and further preferably 60 to 116 branches/1000 carbon atoms. The degree of branching is between that of POE and EPM, constituting a new technical solution that is different from the prior art. Therefore, the rubber matrix of present invention has both excellent aging resistance and good cross-linking performances.

The cross-linking performances include factors such as crosslinking density and crosslinking rate, and are the specific manifestations of the cross-linking ability of the rubber matrix in the processing process.

The branched polyethylene used in the present invention preferably has a methyl branch content of 40% or more or 50% or more, and has a similarity in structure with EPM. In terms of the crosslinking ability, the degree of branching (the content of tertiary carbon atom) and the steric hindrance around the tertiary carbon atom are the two main factors affecting the crosslinking ability of a saturated polyolefin. Compared with EPM, the branched polyethylene used in the present invention has a low degree of branching, and since the branched polyethylene has branches with the carbon number of not less than 2, the steric hindrance around the tertiary carbon atom of the branched polyethylene used in the present invention is theoretically greater than that of EPM. Taking the two factors into account, it can be inferred that the crosslinking ability of the branched polyethylene used in the present invention is weaker than that of EPM and further weaker than that of EPDM. However, the actual crosslinking ability of the partially branched polyethylene used in the present invention is close to, and can even be equal to or better than that of EPDM. This means that the rubber composition of the present invention can achieve a good aging resistance while the crosslinking ability is not weakened, and can even have excellent crosslinking performances to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a cross-linking reaction is more likely to occur. Having a secondary branch structure is a significant distinct of the branched polyethylene used in the preferred embodiment of the present invention from EPM or the conventional ethylene-α-olefin copolymer in the prior art.

It is a new technical solution to improve the crosslinking ability of a saturated polyolefin elastomer by using the secondary branch structure with lower steric hindrance. According to the technical solution of the present invention, it is also considered to be within the technical protection of the present invention to include a vinyl copolymer having a secondary branch structure or other saturated hydrocarbon polymers in the rubber matrix. The vinyl copolymer refers to a copolymer of ethylene with a branched α-olefin and has a secondary branch structure. The branched α-olefin may be selected from the group consisting of isobutene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, and 6-methyl-1-heptene, and the comonomer may also include a common linear α-olefin.

It is generally believed in the prior art that the branched polyethylene produced in the presence of an (α-diimine) nickel catalyst is difficult to have a secondary branch structure that is at least difficult to fully identify, and the technical solution of the present invention also provides a new idea for analyzing the structure of the branched polyethylene.

Compared with the ethylene-propylene rubber, when branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the main chains than the ethylene-propylene rubber, which can effectively avoid the concentration of stress, and contribute to better mechanical properties, including tear strength. Moreover, better crosslinking ability can effectively increase the crosslinking density, and the molecular weight distribution of the branched polyethylene is close to 2, which is narrower than a common ethylene-propylene rubber, so it is expected to obtain better compression set resistance.

In a further technical solution, based on 100 parts by weight of the rubber matrix, the content of the branched polyethylene is A, in which $10 \leq A \leq 100$ parts, the content of EPM and EPDM is B, in which $0 \leq B \leq 90$ parts, where the branched polyethylene is an ethylene homopolymer having a degree of branching of 60-130 branches/1000 carbon atoms, a weight average molecular weight of 66,000-518,000, and a Mooney viscosity ML (1+4) at 125° C. of 6-102.

In a further preferred technical solution, the branched polyethylene has a degree of branching of 70-116 branches/1000 carbon atoms, a weight average molecular weight of 201,000-436,000, and a Mooney viscosity ML (1+4) at 125° C. of 23-101.

In a further preferred technical solution, the branched polyethylene has a degree of branching of 80-105 branches/1000 carbon atoms, a weight average molecular weight of 250,000-400,000, and a Mooney viscosity ML (1+4) at 125° C. of 40-95.

In a further preferred technical solution, the branched polyethylene has a degree of branching of 80-105 branches/1000 carbon atoms, a weight average molecular weight of 268,000-356,000, and a Mooney viscosity ML (1+4) at 125° C. of 42-80.

In a further technical solution, a third monomer of EPDM is preferably a diene monomer, particularly selected from the group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylidene-2-norbornene, 1,5-cyclooctadiene, 1,4-cyclooctadiene, and the like. In particular, the ethylene-propylene rubber may contain two or more diene monomers, for example, 5-ethylidene-2-norbornene and 5-vinyl-2-norbornene. The functional group of the diene monomer can function as an intrinsic auxiliary crosslinking agent in the peroxide vulcanization to improve the crosslinking efficiency. This reduces the amount and residue of the crosslinking agent and the auxiliary crosslinking agent required and the cost when they are added. The content in percentages by weight of the diene monomer relative to the ethylene-propylene rubber is preferably from 1% to 14%, more preferably from 3% to 10%, and further preferably from 4% to 7%.

In a further technical solution, the crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate. More preferably, the crosslinking agent is 2 to 6 parts by weight.

In a further technical solution, the staple fiber comprises at least one of a polyamide staple fiber or an aramid staple fiber, where the polyamide staple fiber includes at least one of nylon 6, nylon 66 and nylon 610, and the length of the staple fiber is 1-8 mm. In addition to the polyamide and aramid staple fibers, the staple fiber used in the present invention may also be selected from cotton staple fiber, lignin staple fiber, ultra-high molecular weight polyethylene staple fiber, and the like.

In a further technical solution, the rubber composition further comprises auxiliary components, which comprise, based on 100 parts by weight of the rubber matrix, 0.3-15 parts of an auxiliary crosslinking agent, 3-25 parts of a metal oxide, 3-90 parts of a plasticizer, 30-100 parts of a reinforcing filler, 1-3 parts of a stabilizer, 3-20 parts of a metal salt of an unsaturated carboxylic acid, and 0-4 parts of a vulcanization accelerator.

In a further technical solution, the auxiliary components comprise, in parts by weight, 0.5-5 parts of an auxiliary crosslinking agent, 5-20 parts of a metal oxide, 5-60 parts of a plasticizer, 40-80 parts of a reinforcing filler, 1-2 parts of a stabilizer, 5-15 parts of a metal salt of an unsaturated carboxylic acid, and 0-3 parts of a vulcanization accelerator.

In a further technical solution, the auxiliary crosslinking agent comprises at least one of triallyl cyanurate, triallyl isocyanurate, triallyl trimellitate, trimethylolpropane trimethacrylate, ethylene glycol dimethacrylate, N,N'-m-phenylene bismaleimide, N,N'-bis(furfurylidene) acetone, 1,2-polybutadiene, and sulfur.

In a further technical solution, the metal oxide includes at least one of zinc oxide, magnesia, and calcium oxide.

In a further technical solution, the plasticizer comprises at least one of pine tar, motor oil, paraffin oil, coumarone, RX-80, naphthenic oil, stearic acid, paraffin, liquid ethylene-propylene rubber, and liquid polyisobutene. Stearic acid can also act as an active agent in a sulfur vulcanization-based system, and reacts with some metal oxides to form soluble salts, thereby increasing the activation of a promoter by metal oxides. Proper use of a plasticizer can increase the elasticity of the rubber compound and the plasticity suitable for process operation. In order to increase the adhesion, it is also preferred to use a tackifier such as pine tar, coumarone, RX-80, liquid polyisobutene and the like.

In a further technical solution, the reinforcing filler comprises at least one of carbon black, silica, calcium carbonate, calcined clay, magnesium silicate, aluminium silicate, and magnesium carbonate.

In a further technical solution, based on 100 parts by weight of the rubber matrix, the carbon black is used in an amount of 30-60 parts by weight.

In a further technical solution, the stabilizer comprises at least one of 2,2,4-trimethyl-1,2-dihydroquinoline polymer (RD), 6-ethoxy-2,2,4-trimethyl-1,2-dihydroquinoline (AW), 2-mercaptobenzimidazole (MB) and N-4(anilinophenyl)maleimide (MC).

In a further technical solution, the metal salt of an unsaturated carboxylic acid includes at least one of zinc methacrylate, magnesium methacrylate, aluminum methacrylate, and calcium methacrylate.

In a further technical solution, the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

In a further technical solution, the staple fiber is preferably one that is surface pretreated and has good blending performance with a non-polar rubber.

In an embodiment of the present invention, in order to improve the adhesion of the rubber compound, the rubber composition may further comprise a tackifier. The pine tar, coumarone resin, RX-80, and liquid polyisobutene mentioned above for the plasticizer also have a tackifying effect. The liquid coumaroneresin has a better tackifying effect than that of a solid coumaroneresin. The tackifier can also be selected from the group consisting of C5 petroleum resin, C9 petroleum resin, hydrogenated rosin, terpene resin, alkyl phenolic resin, modified alkyl phenolic resin, alkylphenol-acetylene resin, and other commonly used tackifiers. The tackifier is usually used in an amount of not more than 30 parts by weight, further preferably not more than 10 parts by weight, and further preferably not more than 5 parts by weight, based on 100 parts by weight of the rubber matrix.

The crosslinking agent, the auxiliary crosslinking agent and the vulcanization accelerator involved in the rubber composition provided in the present invention all belong to a crosslinking system.

The rubber composition of the present invention may be present in the form of an uncrosslinked rubber mix, and may be present in the form of a vulcanized rubber after a further crosslinking reaction. The vulcanized rubber may also be simply referred to as a vulcanizate.

The present invention also provides a processing method for obtaining the rubber composition, which comprises the following steps:

(1) setting the temperature and the rotor speed of an internal mixer, adding other components than a crosslinking system in the rubber composition sequentially to the internal mixer and mixing; then adding the crosslinking system, mixing, and discharging, where the crosslinking system comprises a crosslinking agent, and also at least one of an auxiliary crosslinking agent and a vulcanization accelerator;

(2) plasticating the rubber mix obtained in the step (1) several times on an open mill with a roll gap that is not larger than half of the length of the staple fiber used, then increasing the roll gap, unloading the sheet, and stnding;

(3) cutting the rubber mix sheet obtained in the step (2), filling into a cavity of a mold, vulcanizing on a press vulcanizer by heating and pressing, and releasing from the mold to obtain a vulcanized rubber. In order to improve the compression set resistance of the vulcanized rubber, a post vulcanization process can be further used for vulcanization.

The present invention also provides a power transmission belt comprising: a body having a length including a buffer rubber layer and a compression rubber layer, where the compression rubber layer comprises the above-mentioned rubber composition. In the buffer rubber layer, the same rubber matrix as that in the compression rubber layer may be used, and the buffer rubber layer may or may not contain the above-mentioned staple fibers, and preferably does not contain the staple fibers to improve the bonding performance.

The load-bearing core wire in the buffer rubber layer is preferably one having high strength and low elongation, and may be specifically selected from the group consisting of polyester fiber, aramid fiber, glass fiber, ultrahigh molecular weight polyethylene fiber, and so one. The polyester fiber may be selected from the group consisting of polyaryl ester fiber, polybutylene terephthalate fiber, polyethylene terephthalate fiber, polypropylene terephthalate fiber, polyethylene naphthalate fiber, and the like. Preferably, the load-bearing core wire is subjected to a bonding treatment to improve the adhesion between the load-bearing core wire and the rubber, where the bonding treatment can be performed by steeping the load-bearing core wire in a treatment solution such as resorcinol formaldehyde latex (PFL steeping fluid), heating and drying.

The power transmission belt provided in the present invention further comprises a reinforcing fabric which is generally located outside the buffer rubber layer, and may be a fabric of plain weave, twill weave, and satin weave of cotton fiber, polyester fiber, aramid fiber, polyamide fiber, and ultrahigh molecular weight polyethylene fiber. It is preferable to use a rubber canvas coated with a rubber composition and subjected to RFL treatment as a reinforcing fabric.

The power transmission belt of the present invention is not limited to the above configuration. For example, a ribbed belt without the buffer rubber layer, and a V-belt provided with a back rubber layer in place of the reinforcing fabric and exposing on the back of the belt are also included in the technical scope of the present invention.

In a further technical solution, the compression rubber layer of the power transmission belt further comprises, based on 100 parts by weight of the rubber matrix, 10 to 80 parts by weight and further preferably 10 to 60 parts by weight of a solid lubricant, where the solid lubricant comprises at least one of graphite, mica, molybdenum disulfide and polytetrafluoroethylene.

The present invention also provides a method for producing a power transmission belt. When the power transmission belt is a ribbed belt, the production method comprises the following steps:
(1) rubber mixing, comprising: mixing the rubber compound in the compression rubber layer by mixing the rubber matrix and the staple fiber in an internal mixer for 120 to 140 seconds, so that the staple fiber is well dispersed into the rubber matrix; then adding the remaining components other than the crosslinking system sequentially and mixing for 150-240 seconds; after fully mixing, discharging to obtain a masterbatch; allowing the masterbatch to stand at room temperature for not less than 24 hours, and placing it on a roller of an open mill; after the surface of the masterbatch cladding roller becomes smooth, adding the crosslinking system; cutting and turnover milling after the adjuvants were fully mixed into the masterbatch, plasticating the rubber compound, and then discharging a sheet; and allowing the rubber sheet to stand at room temperature for a period of time, where the crosslinking system comprises a crosslinking agent, and also at least one of an auxiliary crosslinking agent and a vulcanization accelerator; and mixing the rubber compound containing no staple fiber in the buffer rubber layer by a process comprising: setting the temperature and the rotor speed of an internal mixer, mixing the rubber matrix in the internal mixer for 60 to 120 seconds, and adding other components than the crosslinking system in the rubber composition sequentially to the internal mixer and mixing; then adding the crosslinking system, mixing, and discharging; and plasticating the rubber mix on an open mill, unloading the sheet, standing and inspecting; and
(2) molding by a reverse molding method comprising: mounting a blank mold on a forming machine, cleaning the mold, applying a small amount of a release agent, attaching a top cloth (reinforcing fabric) of the ribbed belt to the blank mold after the volatilization of the release agent, then attaching the buffer layer rubber compound, correcting the tension of the string, flatly winding the strength layer, then attaching the buffer rubber, and finally attaching the compression rubber to the outer circumference required by the molding process to obtain a belt blank;
(3) vulcanization by a rubber jacket vulcanization process comprising sending the belt blank to a vulcanization tank for vulcanization, where the vulcanization temperature is 155-175° C., the internal pressure is 0.45-0.55 MPa, the external pressure is 1.0-1.2 MPa, and the vulcanization time is 25-30 minutes;
(4) post-treatment, comprising: after the vulcanization is completed, cooling the mold, releasing the belt from the mold, sending the belt roll to a cutting procedure, cutting according to the required width, rubbing the back side, rubbing the ribs, trimming, and inspecting, to obtain a finished product.

The transmission belt produced by using the rubber composition provided in the present invention as a rubber compound in the compression layer compound also includes, but is not limited to, a classical wrapped V-belt, a narrow wrapped V-belt, a banded wrapped belt, a wrapped agricultural belt, a hexagonal belt, a raw edge V-belt, a raw edge narrow V-belt, a raw edge banded V-belt, a raw edge variable speed V-belt for machinery, a raw edge variable speed V-belt for industry, and a variable speed V-belt for motorcycle.

The present invention also provides a conveyor belt comprising a working face cover rubber and a non-working face cover rubber, at least one of which comprises the rubber composition.

The present invention also provides a method for producing a conveyor belt having a working face cover rubber comprising the rubber composition. The production method comprises the following steps:
(1) rubber mixing, comprising: setting the temperature and the rotor speed of an internal mixer, mixing the rubber matrix and the staple fiber in the internal mixer for 120 to 140 seconds, so that the staple fiber is well dispersed into the rubber matrix; then adding the remaining components other than the crosslinking system sequentially and mixing for 150-240 seconds; after fully mixing, discharging to obtain a masterbatch; allowing the masterbatch to stand at room temperature for not less than 24 hours, and placing it on a roller of an open mill; after the surface of the masterbatch cladding roller becomes smooth, adding the crosslinking system; cutting and turnover milling after the adjuvants are fully mixed into the masterbatch, plasticating the rubber compound, and then discharging a sheet; and allowing the rubber sheet to stand at room temperature for a period of time, where the crosslinking system comprises a crosslinking agent, and also at least one of an auxiliary crosslinking agent and a vulcanization accelerator; and
(2) calendering process, comprising: hot milling the rubber mix obtained in the step (1) in a screw extruder, then supplying the rubber mix to a calender, calendering, and heat preserving the sheet discharged for later use;
(3) forming process, comprising: closely laminating the rubber sheet to a pre-formed rubberized canvas belt blank on a forming machine, forming a belt blank of a high-temperature resistant conveyor belt, then rolling up, and standing for vulcanization later;
(4) placing the formed conveyor belt blank in a press vulcanizer for vulcanization in stages; and
(5) after vulcanization, trimming, inspecting, packaging, and storing.

The present invention also provides a rubber roller, in which the rubber compound used comprises a rubber composition as described above.

The present invention also provides a method for producing a rubber roller comprising the steps of:
(1) rubber mixing, comprising: setting the temperature and the rotor speed of an internal mixer, mixing the rubber matrix and the staple fiber in the internal mixer for 120 to 140 seconds, so that the staple fiber is well dispersed into the rubber matrix; then adding the remaining components other than the crosslinking system sequentially and mixing for 150-240 seconds; after fully mixing, discharging to obtain a masterbatch; allowing the masterbatch to stand at room temperature for not less than 24 hours, and placing it on a roller of an open mill; after the surface of the masterbatch cladding roller becomes smooth, adding the crosslinking system; cutting and turnover milling after the adjuvants are fully mixed into the masterbatch, plasticating the rubber compound, and then discharging a sheet; and allowing the rubber sheet to stand at room temperature for 12 h, and then slicing to obtain a final rubber strip, where the cross-linking system comprises a crosslinking agent, and also at least one of an auxiliary crosslinking agent and a vulcanization accelerator;

(2) winding and wrapping, comprising: feeding the rubber strip obtained in the step (1) to a screw extruder, extruding a rubber sheet with a thickness and width required by the process, after the rubber sheet is uniform, starting the rotating wrapping machine to wind the rubber sheet onto a metal roller core, winding and wrapping the rubber layer by layer until the thickness at the wrapped single side reaches the specified thickness, and then winding 2-3 layers of nylon cure wrapping tape on the rubber surface to obtain a wrapped rubber roller;

(3) vulcanization by a vulcanization tank, comprising sending the wrapped rubber roller to a vulcanization tank, closing the tank, and vulcanizing by introducing steam to the vulcanization tank, during which the compressed air valve is opened to introduce compressed air, such that the pressure in the vulcanization tank reaches 4.5-5 atmospheres in 0.5 h, where the vulcanization procedure comprises heating to 70-80° C. and heat preserving for 2 h; then heating to 100-110° C. and heat preserving for 0.5 h; next heating to 120-130° C. and heat preserving for 0.5 h; then heating to 135-140° C. and heat preserving for 8-10 h; after vulcanization, opening the vent valve to reduce the pressure, opening the safety pin when the pressure gauge points to zero, then half opening the vulcanization tank when the steam is emitted and escapes from the pin hole to, allow the temperature to decrease, and pulling out the rubber roller when the temperature inside the tank is lower than 60° C. or equivalent to the room temperature; and (4) post-treatment: roughly machining the vulcanized rubber roller on a lathe, then finishing on a grinding machine, and inspecting to obtain a finished product.

The rubber composition provided in the present invention can also be used for producing staple fiber reinforced hoses, rubber sheets, and base rubber of solid tires.

Compared with the prior art, the present invention has the following beneficial effects. The heat aging resistance of the rubber composition containing branched polyethylene is maintained at the same level as or slightly better than that of the rubber composition comprising an ethylene-propylene rubber alone, and could meet the requirements for use at high temperature of the power transmission belt, conveyor belt, and rubber roller at present. Moreover, provided that other ingredients in the formation are the same or similar, the rubber composition containing branched polyethylene has higher mechanical strength, and thus could solve the problem that the rubber composition comprising ethylene-propylene rubber as the main rubber component has lower mechanical strength in the peroxide vulcanization system to some extent.

DETAILED DESCRIPTION

Hereinafter, the rubber composition and use thereof according to the present invention are further described by way of examples. The following examples are merely used to illustrate the technical solutions, and not intended to limit the present invention. All parts in the examples are parts by weight, unless otherwise specifically described.

To more clearly illustrate the embodiments of the present invention, the materials involved in the present invention are defined below.

The crosslinking system includes a crosslinking agent, and also at least one of an auxiliary crosslinking agent and a vulcanization accelerator.

In the examples of the present invention, the aramid staple fiber is made of para-aramid, and the nylon staple fiber is made of nylon 66.

The EPM used preferably has a Mooney viscosity ML (1+4) at 125° C. of 30-50 and preferably has an ethylene content of 45%-60%. The EPDM used preferably has a Mooney viscosity ML (1+4) at 125° C. of 20 to 100 and further preferably 30 to 70, and preferably has an ethylene content of 50% to 75%. The third monomer is 5-ethylidene-2-norbornene, 5-vinyl-2-norbornene or dicyclopentadiene, and the content of the third monomer is 1%-7%.

The branched polyethylene can be obtained by the catalytic homopolymerization of ethylene in the presence of an (α-diimine) nickel catalyst and a cocatalyst. The structure of the (α-diimine) nickel catalyst used, the synthesis method and the method for preparing branched polyethylene therewith are disclosed in the prior art, as described in, without limitation, CN102827312A, CN101812145A, CN101531725A, CN104926962A, U.S. Pat. Nos. 6,103,658, and 6,660,677.

The branched polyethylene used is characterized by having a degree of branching of 60-130 branches/1000 carbon atoms, a weight average molecular weight of 66,000-518,000, and a Mooney viscosity ML (1+4) at 125° C. of 6-102. The degree of branching is measured by $^1$H NMR, and the molar percentages of various branches are measured by $^{13}$C NMR.

The details are shown in a table below:

| Branched polyethylene No. | Degree of branching | Methyl content/% | Ethyl content/% | Propyl content/% | Butyl content/% | Pentyl content/% | Content of hexyl and higher branches/% | Weight average molecular weight/ 10,000 | Molecular weight distribution | Mooney viscosity ML(1 + 4) 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 9 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |

-continued

| Branched polyethylene No. | Degree of branching | Methyl content/% | Ethyl content/% | Propyl content/% | Butyl content/% | Pentyl content/% | Content of hexyl and higher branches/% | Weight average molecular weight/ 10,000 | Molecular weight distribution | Mooney viscosity ML(1 + 4) 125° C. |
|---|---|---|---|---|---|---|---|---|---|---|
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |
| PER-8 | 70 | 66.5 | 7.2 | 4.6 | 3.2 | 3.2 | 15.3 | 43.6 | 2.1 | 93 |
| PER-9 | 60 | 68.1 | 7.1 | 4.2 | 2.7 | 2.8 | 15.1 | 51.8 | 2.2 | 102 |
| PER-10 | 87 | 61.8 | 10.3 | 5.4 | 4.6 | 4.9 | 12.0 | 40.1 | 1.8 | 101 |
| PER-11 | 94 | 60.5 | 10.8 | 5.7 | 4.7 | 4.9 | 13.3 | 37.8 | 2.0 | 85 |
| PER-12 | 102 | 56.8 | 12.7 | 6.1 | 5.2 | 5.1 | 13.9 | 34.8 | 1.9 | 66 |

Test Methods of Rubber Performances
1. Hardness test: The test is carried out using a hardness tester at room temperature in accordance with the national standard GB/T 531.1-2008.
2. Tensile strength and elongation at break performance test: The test is carried out with a type 2 dumbbell specimen using an electronic tensile tester at a tensile speed of 500 mm/min and a test temperature of 23±2° C. in accordance with the national standard GB/T528-2009.
3. Tear strength test: The test is carried out with a right-angled specimen using an electronic tensile tester at a tensile speed of 500 mm/min and a test temperature of 23±2° C. in accordance with the national standard GB/T529-2008.
4. DIN abrasion test: The test is carried out at a test temperature of 23±2° C. with a cylindrical vulcanized rubber specimen using a cylindrical drum abrasion machine having a diameter of 16±0.2 mm and a height of 8 mm in accordance with the national standard GB/T9867-1998.
5. Mooney viscosity test: The test is carried out in accordance with the national standard GB/T1232.1-2000, with a Mooney viscosity meter at a test temperature of 125° C. by preheating for 1 minute, and the test is continued for 4 minutes.
6. Hot air accelerated aging test: The test is carried out in a heat aging test chamber at 150° C. for 72 h in accordance with the national standard GB/T3512-2001.
7. Test of optimum vulcanization time Tc90: The test is carried out at 160° C. in a rotorless vulcanizer in accordance with the national standard GB/T16584-1996.

The vulcanization conditions in the following Examples 1 to 13 and Comparative Examples 1 and 2 include temperature: 160° C.; pressure: 16 MPa; and time Tc90+2 min.

Example 1

Branched Polyethylene No. PER-9 Was Used

The processing steps were as follows.
(1) Rubber mixing: The temperature of the internal mixer was set to 100° C., and the rotor speed was set to 50 rpm. 90 parts of EPDM and 10 parts of branched polyethylene were added, prepressed and mixed for 90 seconds. 10 parts of zinc oxide, 2 parts of stearic acid, and 1 part of the anti-aging agent RD were added and mixed for 1 min. Then 60 parts of carbon black N330, 20 parts of paraffin oil SUNPAR2280 and 5 parts of liquid ethylene-propylene rubber were added to the rubber compound, and mixed for 3 min. Next, 5 parts of 1 mm-long aramid staple fiber was added and mixed for 2 min. Finally, 4 parts of the cross-linking agent dicumyl peroxide (DCP), 1 part of the auxiliary crosslinking agent triallyl isocyanurate (TAIC) and 0.3 part of sulfur were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded, and stood for 20 hours.
(2) After vulcanization, various tests were carried out after standing for 16 hrs.

Example 2

Branched Polyethylene No. PER-2 Was Used

The processing steps were as follows.
(1) Rubber mixing: The temperature of the internal mixer was set to 90° C., and the rotor speed was set to 50 rpm. 80 parts of EPDM and 20 parts of branched polyethylene were added, prepressed and mixed for 90 seconds. 10 parts of zinc oxide, 2 parts of stearic acid, and 1 part of the anti-aging agent RD were added and mixed for 1 min. Then 60 parts of carbon black N330, 20 parts of paraffin oil SUNPAR2280 and 5 parts of liquid ethylene-propylene rubber were added to the rubber compound, and mixed for 3 min. Next, 5 parts of 1 mm-long aramid staple fiber was added and mixed for 2 min. Finally, 4 parts of the crosslinking agent dicumyl peroxide (DCP), 1 part of the auxiliary crosslinking agent triallyl isocyanurate (TAIC) and 0.3 part of sulfur were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded, and stood for 20 hours.
(2) After vulcanization, various tests were carried out after standing for 16 hrs.

Example 3

Branched Polyethylene No. PER-4 Was Used

The processing steps were as follows.

(1) Rubber mixing: The temperature of the internal mixer was set to 90° C., and the rotor speed was set to 50 rpm. 50 parts of EPM and 50 parts of branched polyethylene were added, prepressed and mixed for 90 seconds. 10 parts of zinc oxide, 2 parts of stearic acid, and 1 part of the anti-aging agent RD were added and mixed for 1 min. Then 60 parts of carbon black N330, 15 parts of paraffin oil SUNPAR2280, 5 parts of coumarone resin and 5 parts of liquid ethylene-propylene rubber were added to the rubber compound, and mixed for 3 min. Next, 5 parts of 1 mm-long aramid staple fiber was added and mixed for 2 min. Finally, 4 parts of the crosslinking agent dicumyl peroxide (DCP), 1 part of the auxiliary crosslinking agent triallyl isocyanurate (TAIC) and 0.3 part of sulfur were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded, and stood for 20 hours.

(2) After vulcanization, various tests were carried out after standing for 16 hrs.

Example 4

Branched Polyethylene No. PER-5 Was Used

The processing steps were as follows.

(1) Rubber mixing: The temperature of the internal mixer was set to 90° C., and the rotor speed was set to 50 rpm. 100 parts of branched polyethylene was added, prepressed and mixed for 90 seconds. 10 parts of zinc oxide, 2 parts of stearic acid, and 1 part of the anti-aging agent RD were added and mixed for 1 min. Then 60 parts of carbon black N330, 20 parts of paraffin oil SUNPAR2280 and 5 parts of liquid ethylene-propylene rubber were added to the rubber compound, and mixed for 3 min. Next, 5 parts of 1 mm-long aramid staple fiber was added and mixed for 2 min. Finally, 4 parts of the crosslinking agent dicumyl peroxide (DCP), 1 part of the auxiliary crosslinking agent triallyl isocyanurate (TAIC) and 0.3 part of sulfur were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded, and stood for 20 hours.

(2) After vulcanization, various tests were carried out after standing for 16 hrs.

Example 5

Branched Polyethylene No. PER-3 Was Used

The processing steps were as follows.

(1) Rubber mixing: The temperature of the internal mixer was set to 90° C., and the rotor speed was set to 50 rpm. 100 parts of branched polyethylene was added, prepressed and mixed for 90 seconds. 5 parts of zinc oxide, 1.5 parts of stearic acid, 1 part of the anti-aging agent RD, and 2 parts of polyethylene glycol PEG4000 were added and mixed for 1 min. Then 100 parts of carbon black N330, and 30 parts of paraffin oil SUNPAR2280 were added to the rubber compound, and mixed for 3 min. Next, 12 parts of 1 mm-long aramid staple fiber was added and mixed for 2 min. Finally, 9 parts of the crosslinking agent dicumyl peroxide (DCP), 2 parts of the auxiliary crosslinking agent triallyl isocyanurate (TAIC), 10 parts of liquid 1,2-polybutadiene and 5 parts of zinc methacrylate were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded, and stood for 20 hours.

(2) After vulcanization, various tests were carried out after standing for 16 hrs.

Example 6

Branched Polyethylene No. PER-5 Was Used

The processing steps were as follows.

(1) Rubber mixing: The temperature of the internal mixer was set to 90° C., and the rotor speed was set to 50 rpm. 20 parts of EPM, 50 parts of EPDM and 30 parts of branched polyethylene were added, prepressed and mixed for 90 seconds. 20 parts of zinc oxide, 5 parts of magnesia, 2 parts of stearic acid, and 1 part of the anti-aging agent RD were then added, and mixed for 1 min. Then 50 parts of carbon black N330, 10 parts of paraffin oil SUNPAR2280 and 5 parts of liquid ethylene-propylene rubber were added to the rubber compound, and mixed for 3 min. Next, 6 parts of 1 mm-long aramid staple fiber was added and mixed for 2 min. Finally, 6 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded and stood for 20 hours.

(2) After vulcanization, various tests were carried out after standing for 16 hrs.

Comparative Example 1

The processing steps were as follows.

(1) Rubber mixing: The temperature of the internal mixer was set to 90° C., and the rotor speed was set to 50 rpm. 100 parts of EPM was added, prepressed and mixed for 90 seconds. 10 parts of zinc oxide, 2 parts of stearic acid, and 1 part of the anti-aging agent RD were then added, and mixed for 1 min. Then 60 parts of carbon black N330, 20 parts of paraffin oil SUNPAR2280 and 5 parts of liquid ethylene-propylene rubber were added to the rubber compound, and mixed for 3 min. Next, 5 parts of 1 mm-long aramid staple fiber was added and mixed for 2 min. Finally, 4 parts of the crosslinking agent dicumyl peroxide (DCP), 1 part of the auxiliary crosslinking agent triallyl isocyanurate (TAIC) and 0.3 part of sulfur were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded and stood for 20 hours.

(2) After vulcanization, various tests were carried out after standing for 16 hrs.

The performance test data of Examples 1 to 6 and Comparative Example 1 are shown in a table below.

| Test Item | Comparative Example 1 | Example 1 | Example 2 | Example 3 | Example 4 | Example 5 | Example 6 |
|---|---|---|---|---|---|---|---|
| Hardness | 62 | 65 | 62 | 61 | 63 | 71 | 67 |
| Tensile strength/MPa | 15.4 | 16.8 | 15.8 | 17.6 | 20.8 | 17.4 | 15.2 |
| Elongation at break/% | 377 | 334 | 368 | 423 | 452 | 251 | 347 |
| DIN Relative abrasion volume/mm$^3$ | 104 | 98 | 102 | 103 | 96 | 109 | 100 |
| After aging (at 150° C. for 70 h) | | | | | | | |
| Hardness | 64 | 67 | 63 | 62 | 65 | 74 | 68 |
| Retention rate of tensile strength/% | 93 | 96 | 94 | 93 | 92 | 95 | 99 |
| Retention rate of elongation at break/% | 89 | 91 | 88 | 91 | 89 | 84 | 112 |

It can be seen through comparison of the performances of Examples 1 to 4 and Comparative Example 1 that as the content of branched polyethylene increases, the tensile strength gradually increases, while good heat aging resistance is maintained.

Example 7

Branched Polyethylene No. PER-8 Was Used

The processing steps were as follows.

(1) Rubber mixing: The temperature of the internal mixer was set to 90° C., and the rotor speed was set to 50 rpm. 90 parts of EPDM and 10 parts of branched polyethylene were added, prepressed and mixed for 90 seconds. 6 parts of zinc oxide, 1 part of stearic acid, and 2 parts of the anti-aging agent RD were then added, and mixed for 1 min. Then 45 parts of carbon black N330, 5 parts of paraffin oil SUN-PAR2280 and 5 parts of coumarone resin were added to the rubber compound, and mixed for 3 min. Next, 30 parts of 1 mm-long nylon staple fiber was added and mixed for 2 min. Finally, 4 parts of the crosslinking agent dicumyl peroxide (DCP), and 1.5 parts of the auxiliary crosslinking agent triallyl isocyanurate (TAIC) were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded and stood for 20 hours.

(2) After vulcanization, various tests were carried out after standing for 16 hrs.

Example 8

Branched Polyethylene No. PER-7 Was Used

The processing steps were as follows.

(1) Rubber mixing: The temperature of the internal mixer was set to 90° C., and the rotor speed was set to 50 rpm. 70 parts of EPDM and 30 parts of branched polyethylene were added, prepressed and mixed for 90 seconds. 6 parts of zinc oxide, 1 part of stearic acid, and 2 parts of the anti-aging agent RD were then added, and mixed for 1 min. Then 45 parts of carbon black N330, 5 parts of paraffin oil SUN-PAR2280 and 5 parts of coumarone resin were added to the rubber compound, and mixed for 3 min. Next, 30 parts of 1 mm-long nylon staple fiber was added and mixed for 2 min. Finally, 1 part of the crosslinking agent dicumyl peroxide (DCP), 0.3 part of the auxiliary crosslinking agent triallyl isocyanurate (TAIC), 0.5 part of crosslinking agent sulfur, 1.5 parts of N-cyclohexyl-2-benzothiazole sulfenamide (CZ), and 1 part of tetramethyl thiuram disulfide (TMTD) were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded and stood for 20 hours.

(2) After vulcanization, various tests were carried out after standing for 16 hrs.

Example 9

Branched Polyethylene No. PER-6 Was Used

The processing steps were as follows.

(1) Rubber mixing: The temperature of the internal mixer was set to 90° C., and the rotor speed was set to 50 rpm. 70 parts of EPM and 30 parts of branched polyethylene were added, prepressed and mixed for 90 seconds. 6 parts of zinc oxide, 1 part of stearic acid, and 2 parts of the anti-aging agent RD were then added, and mixed for 1 min. Then 60 parts of carbon black N330, 5 parts of paraffin oil SUN-PAR2280 and 5 parts of coumarone resin were added to the rubber compound, and mixed for 3 min. Next, 10 parts of 1 mm-long nylon staple fiber was added and mixed for 2 min. Finally, 2 parts of the crosslinking agent dicumyl peroxide (DCP), 0.5 part of the crosslinking agent sulfur and 15 parts of magnesium methacrylate were added, mixed for 2 min, and then discharged.

The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded and stood for 20 hours.

(2) After vulcanization, various tests were carried out after standing for 16 hrs.

Example 10

Branched Polyethylene No. PER-6 Was Used

The processing steps were as follows.

(1) Rubber mixing: The temperature of the internal mixer was set to 90° C., and the rotor speed was set to 50 rpm. 50 parts of EPDM and 50 parts of branched polyethylene were added, prepressed and mixed for 90 seconds. 6 parts of zinc oxide, 1 part of stearic acid, and 2 parts of the anti-aging agent RD were then added, and mixed for 1 min. Then 45 parts of carbon black N330, 20 parts of polytetrafluoroethylene, 5 parts of paraffin oil SUNPAR2280 and 5 parts of coumarone resin were added to the rubber compound, and mixed for 3 min. Next, 20 parts of 1 mm-long nylon staple fiber was added and mixed for 2 min. Finally, 4 parts of the crosslinking agent dicumyl peroxide (DCP), and 1.5 parts of the auxiliary crosslinking agent triallyl isocyanurate (TAIC) were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded and stood for 20 hours.

(2) After vulcanization, various tests were carried out after standing for 16 hrs.

Example 11

Branched Polyethylene No. PER-5 Was Used

The processing steps were as follows.

(1) Rubber mixing: The temperature of the internal mixer was set to 90° C., and the rotor speed was set to 50 rpm. 30 parts of EPDM and 70 parts of branched polyethylene were added, prepressed and mixed for 90 seconds. 6 parts of zinc oxide, 1 part of stearic acid, and 2 parts of the anti-aging agent RD were added and mixed for 1 min. Then 30 parts of carbon black N330, 5 parts of paraffin oil SUNPAR2280 and 5 parts of coumarone resin were added to the rubber compound, and mixed for 3 min. Next, 60 parts of 1 mm-long nylon staple fiber was added and mixed for 2 min. Finally, 8 parts of the crosslinking agent dicumyl peroxide (DCP), 1.5 part of the auxiliary crosslinking agent triallyl isocyanurate (TAIC) and 10 parts of magnesium methacrylate were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded, and stood for 20 hours.

(2) After vulcanization, various tests were carried out after standing for 16 hrs.

Example 12

Branched Polyethylene Nos. PER-1 And PER-7 Were Used

The processing steps were as follows.

(1) Rubber mixing: The temperature of the internal mixer was set to 90° C., and the rotor speed was set to 50 rpm. 20 parts of PER-1 and 80 parts of PER-7 were added, prepressed and mixed for 90 seconds. 6 parts of zinc oxide, 1 part of stearic acid, and 2 parts of the anti-aging agent RD were added and mixed for 1 min. Then 45 parts of carbon black N330, 5 parts of paraffin oil SUNPAR2280 and 5 parts of coumarone resin were added to the rubber compound, and mixed for 3 min. Next, 20 parts of 1 mm-long nylon staple fiber was added and mixed for 2 min. Finally, 4 parts of the crosslinking agent dicumyl peroxide (DCP), 1.3 parts of the auxiliary crosslinking agent triallyl isocyanurate (TAIC), 0.2 part of the auxiliary crosslinking agent sulfur and 7 parts of zinc methacrylate were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded, and stood for 20 hours.

(2) After vulcanization, various tests were carried out after standing for 16 hrs.

Example 13

Branched Polyethylene No. PER-5 Was Used

The processing steps were as follows.

(1) Rubber mixing: The temperature of the internal mixer was set to 90° C., and the rotor speed was set to 50 rpm. 100 parts of branched polyethylene were added, prepressed and mixed for 90 seconds. 6 parts of zinc oxide, 1 part of stearic acid, and 2 parts of the anti-aging agent RD were then added, and mixed for 1 min. Then 45 parts of carbon black N330, 5 parts of paraffin oil SUNPAR2280 and 5 parts of coumarone resin were added to the rubber compound, and mixed for 3 min. Next, 20 parts of 1 mm-long nylon staple fiber was added and mixed for 2 min. Finally, 4 parts of the crosslinking agent dicumyl peroxide (DCP), and 1.5 parts of the auxiliary crosslinking agent triallyl isocyanurate (TAIC) were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded and stood for 20 hours.

(2) After vulcanization, various tests were carried out after standing for 16 hrs.

Comparative Example 2

The processing steps were as follows.

(1) Rubber mixing: The temperature of the internal mixer was set to 90° C., and the rotor speed was set to 50 rpm. 100 parts of EPDM was added, prepressed and mixed for 90 seconds. 6 parts of zinc oxide, 1 part of stearic acid, and 2 parts of the anti-aging agent RD were then added, and mixed for 1 min. Then 45 parts of carbon black N330, 5 parts of paraffin oil SUNPAR2280 and 5 parts of coumarone resin were added to the rubber compound, and mixed for 3 min. Next, 20 parts of 1 mm-long nylon staple fiber was added and mixed for 2 min. Finally, 4 parts of the crosslinking agent dicumyl peroxide (DCP), and 1.5 parts of the auxiliary crosslinking agent triallyl isocyanurate (TAIC) were added, mixed for 2 min, and then discharged. The rubber mix was plasticated 7 times on an open mill with a roll temperature of 80° C. and a roll gap of 0.5 mm such that the staple fiber was well oriented, and then the roll gap was increased to obtain a sheet having a thickness of about 2.5 mm, which was unloaded and stood for 20 hours.

(2) After vulcanization, various tests were carried out after standing for 16 hrs.

The performance test data of Examples 7 to 13 and Comparative Example 2 are shown in a table below.

| Test Item | Comparative Example 2 | Example 7 | Example 8 | Example 9 | Example 10 | Example 11 | Example 12 | Example 13 |
| --- | --- | --- | --- | --- | --- | --- | --- | --- |
| Hardness | 80 | 82 | 81 | 84 | 83 | 85 | 83 | 82 |
| L-direction tensile strength/MPa | 14.8 | 15.2 | 16.1 | 18.4 | 14.9 | 19.7 | 19.3 | 17.9 |
| L-direction elongation at break/% | 74 | 68 | 72 | 189 | 121 | 87 | 82 | 69 |
| T-direction tensile strength/MPa | 9.2 | 9.3 | 9.8 | 11.4 | 10.9 | 10.1 | 12.3 | 9.4 |
| T-direction elongation at break/% | 240 | 235 | 220 | 256 | 308 | 232 | 246 | 248 |
| T-direction tensile strength at 100%/MPa | 3.4 | 4.5 | 4.8 | 4.9 | 6.4 | 5.4 | 5.7 | 5.2 |
| Tear strength/(N/mm) | 36.9 | 37.3 | 40.2 | 47.2 | 45.8 | 48.2 | 56.2 | 51.3 |

In the table, the L direction is the direction of orientation of the staple fiber, and the T direction is a direction perpendicular to the direction of orientation of the staple fiber.

It can be seen through comparison of the performances of Examples 7 to 13 and Comparative Example 2 that as the content of branched polyethylene increases, the tensile strength and tear strength of the vulcanized rubber are obviously increased, while good heat aging resistance is maintained.

Example 14

A staple fiber reinforced high-temperature resistant conveyor belt was produced through a method comprising the following steps.

The conveyor belt comprises a cored tensile canvas provided between a working face cover rubber and a non-working face cover rubber, which are formed and vulcanized into one piece firmly together as a whole.

The components and mixing ratio in the working face cover rubber described in the example of the present invention are in parts by weight.

(1) Rubber Mixing Process

The temperature of the internal mixer was set to 90° C., and the rotor speed was set to 50 rpm. 100 parts of branched polyethylene PER-5 and 6 parts of 1 mm-long aramid staple fiber were added, prepressed and mixed for 120 seconds. 15 parts of zinc oxide, 2 parts of stearic acid, and 1 part of the anti-aging agent RD were added and mixed for 1 min. Then 60 parts of carbon black N330, 20 parts of paraffin oil SUNPAR2280 and 5 parts of liquid ethylene-propylene rubber were added to the rubber compound, mixed for 3 min, and then discharged to obtain a masterbatch. The masterbatch was cooled for 5 h and then added to an internal mixer for secondary mixing by prepressing and mixing for 30 seconds. Next, 4 parts of the crosslinking agent dicumyl peroxide (DCP), 1.5 parts of the auxiliary crosslinking agent triallyl isocyanurate (TAIC), 0.3 part of the auxiliary crosslinking agent sulfur and 5 parts of zinc methacrylate were added, mixed for 2 min, and then discharged, to obtain a final rubber mix for use.

(2) Calendering Process

The rubber mix was hot milled in a screw extruder, then supplied to a calender, and calendered, and the sheet was discharged for later use. The thickness of the rubber sheet was controlled to 4.5-12 mm upon calendering and discharging the sheet, and the rubber sheet was heat preserved for later use. When the rubber sheet was discharged, the aramid staple fiber in the rubber compound was ongitudinally oriented and aligned.

(3) Forming Process

The rubber sheet was closely laminated to a pre-formed rubberized canvas belt blank on a forming machine, and formed into a belt blank of a high-temperature resistant conveyor belt, which was then rolled up, and vulcanized after 4 h.

(4) Vulcanization Process

The formed conveyor belt blank was placed in a press vulcanizer for vulcanization in stages, where the vulcanization time on each plate was 25 min, the vulcanization pressure was 3 MPa, and the vulcanization temperature was 160° C.

(5) Trimming and Inspection

After vulcanization, the belt was trimmed, inspected, packaged, and stored.

Example 15

A high-temperature resistant ribbed belt having a compression layer using the rubber composition provided in the present invention was produced through a method comprising the following steps.

(1) Rubber Mixing

Mixing of rubber compound used in compression rubber layer: The temperature of the internal mixer was set to 90° C., and the rotor speed was set to 50 rpm. 100 parts of branched polyethylene PER-4 and 20 parts of 1 mm-long nylon staple fiber were added, prepressed and mixed for 140 seconds. 6 parts of zinc oxide, 1 part of stearic acid, 2 parts of the anti-aging agent RD, and 5 parts of coumarone resin were added and mixed for 1 min. Then 45 parts of carbon black N330, and 5 parts of paraffin oil SUNPAR2280 were added to the rubber compound, mixed for 3 min, and then discharged. The masterbatch was stood at room temperature for not less than 24 hrs, and placed on a roller of an open mill. After the surface of the masterbatch cladding roller became smooth, 4 parts of the crosslinking agent dicumyl peroxide (DCP), 1.5 parts of the auxiliary crosslinking agent triallyl isocyanurate (TAIC), 10 parts of the auxiliary crosslinking agent zinc methacrylate, and 0.3 part of the auxiliary crosslinking agent sulfur were added and mixed for 3 min. After the adjuvents were fully mixed into the masterbatch, the rubber compound was cut and turnover milled, and then plasticated 7 times with a roll gap of 0.5 mm, such that the staple fiber was well oriented. Then, the roll gap was increased, and the sheet was unloaded and stood for 24 hrs.

Mixing of rubber compound used in buffer rubber layer: The temperature of the internal mixer was set to 90° C., and the rotor speed was set to 40 rpm. 100 parts of branched polyethylene PER-4 was added, prepressed and mixed for 90 seconds. Then, 6 parts of zinc oxide, 2 parts of the anti-aging agent RD, 1 part of stearic acid, and 5 parts of coumarone resin were added and mixed for 1 min. Then 55 parts of carbon black N330 and 5 parts of paraffin oil SUNPAR2280 were added, and mixed for 3 min. Finally, 4 parts of the crosslinking agent dicumyl peroxide (DCP), 1.5 parts of the auxiliary crosslinking agent triallyl isocyanurate (TAIC), 10 parts of the auxiliary crosslinking agent zinc methacrylate and 0.3 part of the auxiliary crosslinking agent sulfur were added, mixed for 2 min, and then discharged. The rubber mix was plasticated on an open mill, and then the sheet was unloaded and stood for 24 hrs.

(2) Molding

A reverse molding method was employed. A blank mold was mounted on a forming machine, the mold was cleaned, a small amount of a release agent was applied, a top cloth of the ribbed belt was attached to the optical mold after the volatilization of the release agent, then the buffer rubber layer was attached, the tension of the string was corrected, the strength layer was flatly wound, then the buffer rubber layer was attached, and finally the compression rubber layer (ribbed rubber) was attached to the outer circumference required by the molding process to obtain a belt blank;

(3) Vulcanization

The belt blank was sent to a vulcanization procedure for vulcanization, where the vulcanization temperature was 160° C., the internal pressure was 0.45-0.55 MPa, the external pressure was 1.0-1.2 MPa, and the vulcanization time was 30 minutes.

(4) Post-Treatment

After the vulcanization was completed, the mold was cooled, the belt was released from the mold, and the belt roll was sent to a cutting procedure, and cut according to the required width. The back side and the ribs were rubbed, and then the belt was trimmed, and inspected, to obtain a finished product.

Example 16

A high-temperature resistant V belt was obtained by mixing, calendering, molding, cutting, wrapping, vulcanization, and cooling, and the rubber in the compression rubber layer was obtained by mixing the rubber composition in Examples 7-13.

Example 17

A high-temperature resistant rubber roller in which the rubber compound used was a rubber composition provided in the present invention was produced through a method comprising the following steps.

(1) Rubber mixing: The temperature of the internal mixer was set to 100° C., and the rotor speed was set to 50 rpm. Then, 100 parts of branched polyethylene PER-5 and 7 parts of aramid staple fiber were mixed in the internal mixer for 130 seconds, such that the staple fiber was well dispersed in the rubber matrix. Then, 6 parts of zinc oxide, 2 parts of the anti-aging agent RD, 1 part of stearic acid, and 5 parts of coumarone resin were added and mixed for 1 min. Then 55 parts of carbon black N330 and 5 parts of paraffin oil SUNPAR2280 were added, mixed for 3 min, and then discharged. The masterbatch was stood at room temperature for not less than 24 hrs, and then placed on a roller of an open mill. After the surface of the masterbatch cladding roller became smooth, 4 parts of the crosslinking agent dicumyl peroxide (DCP), 1.5 parts of the auxiliary crosslinking agent triallyl isocyanurate (TAIC), 10 parts of the auxiliary crosslinking agent zinc methacrylate and 0.3 part of the auxiliary crosslinking agent sulfur were added, mixed for 3 min. After the adjuvents were fully mixed into the masterbatch, the rubber compound was cut and turnover milled, and then plasticated. The sheet was discharged, stood at room temperature for 12 hrs, and sliced to obtain the final rubber strip.

(2) Winding and wrapping: The rubber strip obtained in the step (1) was fed to a screw extruder, and a rubber sheet with a thickness and width required by the process was extruded. After the rubber sheet was uniform, the rotating wrapping machine was started to wind the rubber sheet onto a prepared metal roller core, and the rubber was wound and wrapped layer by layer until the thickness at the wrapped single side reached the specified thickness. Then 2-3 layers of nylon cure wrapping tape was wound on the rubber surface to obtain a wrapped rubber roller.

(3) Vulcanization by a vulcanization tank: The wrapped rubber roller was sent to a vulcanization tank, and then the tank was closed. Steam was introduced into the vulcanization tank for vulcanization, during which the compressed air valve was opened to introduce compressed air, such that the pressure in the vulcanization tank reached 4.5-5 atmospheres in 0.5 h. The vulcanization procedure was heating to 70-80° C. and heat preserving for 2 h; then heating to 100-110° C. and heat preserving for 0.5 h; next heating to 120-130° C. and heat preserving for 0.5 h; and then heating to 135-140° C. and heat preserving for 8-10 h. After vulcanization, the vent valve was opened to reduce the pressure. The safety pin was opened when the pressure gauge pointed to zero. Then the vulcanization tank was half opened when the steam was emitted and escaped from the pin hole, to allow the temperature to decrease. The rubber roller was pulled out when the temperature inside the tank was lower than 60° C. or equivalent to the room temperature.

(4) Post-treatment: The vulcanized rubber roller was roughly machined on a lathe, then finished on a grinding machine, and inspected to obtain a finished product.

Example 18

A working face cover rubber of a staple fiber reinforced high-temperature resistant conveyor belt was mixed through a process below.

The temperature of the internal mixer was set to 90° C., and the rotor speed was set to 50 rpm. 100 parts of branched polyethylene PER-12 and 20 parts of 1 mm-long nylon staple fiber were added, prepressed and mixed for 120 seconds. 10 parts of zinc oxide, 1.5 parts of stearic acid, 3 parts of coumarone, 2 parts of modified alkyl phenolic resin TKM-M and 1 part of the anti-aging agent RD were added and mixed for 1 min. Then 60 parts of carbon black N330, 20 parts of paraffin oil SUNPAR2280 and 5 parts of liquid ethylene-propylene rubber were added to the rubber compound, mixed for 3 min, and then discharged to obtain a masterbatch. The masterbatch was cooled for 5 h and then added to an internal mixer for secondary mixing by prepressing and mixing for 30 seconds. Next, 4 parts of the crosslinking agent dicumyl peroxide (DCP), 1.5 parts of the auxiliary crosslinking agent triallyl isocyanurate (TAIC), 0.3 part of the auxiliary crosslinking agent sulfur and 5 parts of zinc methacrylate were added, mixed for 2 min, and then discharged, to obtain a final rubber mix that was stood for later use.

The rest steps of the production method were the same as those in Example 14.

Example 19

The rubber in the compression layer and the rubber in the buffer layer of a high-temperature resistant ribbed belt having a compression layer using the rubber composition provided in the present invention. were produced through the following steps.

Mixing of rubber compound used in compression rubber layer: The temperature of the internal mixer was set to 90° C., and the rotor speed was set to 50 rpm. 100 parts of branched polyethylene PER-12 and 20 parts of 1 mm-long nylon staple fiber were added, prepressed and mixed for 140 seconds. 6 parts of zinc oxide, 1 part of stearic acid, 1 parts of the anti-aging agent RD, 1 part of the anti-aging agent MB and 5 parts of coumarone resin were added and mixed for 1 min. Then 45 parts of carbon black N330, and 5 parts of paraffin oil SUNPAR2280 were added to the rubber compound, mixed for 3 min, and then discharged. The masterbatch was stood at room temperature for not less than 24 hrs, and placed on a roller of an open mill. After the surface of the masterbatch cladding roller became smooth, 4 parts of the crosslinking agent dicumyl peroxide (DCP), 1.5 parts of the auxiliary crosslinking agent triallyl isocyanurate (TAIC), 5 parts of the auxiliary crosslinking agent zinc methacrylate, and 0.3 part of the auxiliary crosslinking agent sulfur were added and mixed for 3 min. After the adjuvents were fully mixed into the masterbatch, the rubber compound was cut and turnover milled, and then plasticated 7 times with a roll gap of 0.5 mm, such that the staple fiber was well oriented. Then, the roll gap was increased, and the sheet was unloaded and stood for 24 hrs.

Mixing of rubber compound used in buffer rubber layer: The temperature of the internal mixer was set to 90° C., and the rotor speed was set to 40 rpm. 100 parts of branched polyethylene PER-12 was added, prepressed and mixed for 90 seconds. Then, 6 parts of zinc oxide, 2 parts of the anti-aging agent RD, 1 part of stearic acid, 4 parts of coumarone resin, and 3 parts of RX-80 resin were added and mixed for 1 min. Then 55 parts of carbon black N330 and 5 parts of paraffin oil SUNPAR2280 were added, and mixed for 3 min. Finally, 4 parts of the crosslinking agent dicumyl peroxide (DCP), 1.5 parts of the auxiliary crosslinking agent triallyl isocyanurate (TAIC), 5 parts of the auxiliary crosslinking agent zinc methacrylate and 0.3 part of the auxiliary crosslinking agent sulfur were added, mixed for 2 min, and then discharged. The rubber mix was plasticated on an open mill, and then the sheet was unloaded and stood for 24 hrs.

The remaining processing steps were the same as those in Example 15.

The test performance after vulcanization of the rubber mix for the compression layer in this example includes hardness, in which the L-direction tensile strength is 22.7 MPa, the L-direction elongation at break is 89%, the T-direction tensile strength is 13.2 MPa, the T-direction elongation at break is 239% and the tear strength is 67.3 N/mm.

Example 20

The rubber compound used for a high-temperature resistant rubber roller is a rubber composition provided in the present invention, which has a formulation below and is mixed as follows.

The temperature of the internal mixer was set to 100° C., and the rotor speed was set to 50 rpm. Then, 100 parts of branched polyethylene PER-10 and 7 parts of aramid staple fiber were mixed in the internal mixer for 130 seconds, such that the staple fiber was well dispersed in the rubber matrix. Then, 6 parts of zinc oxide, 1 part of stearic acid, 1 part of the anti-aging agent RD, 1 part of the anti-aging agent MB, 5 parts of coumarone resin and 5 parts of terpene resin were added and mixed for 1 min. Then 55 parts of carbon black N330 and 5 parts of paraffin oil SUNPAR2280 were added, mixed for 3 min, and then discharged. The masterbatch was stood at room temperature for not less than 24 hrs, and then placed on a roller of an open mill. After the surface of the masterbatch cladding roller became smooth, 4 parts of the crosslinking agent dicumyl peroxide (DCP), 1.5 parts of the auxiliary crosslinking agent triallyl isocyanurate (TAIC), 10 parts of the auxiliary crosslinking agent zinc methacrylate and 0.3 part of the auxiliary crosslinking agent sulfur were added, mixed for 3 min. After the adjuvents were fully mixed into the masterbatch, the rubber compound was cut and turnover milled, and then plasticated. The sheet was discharged, stood at room temperature for 12 hrs, and sliced to obtain the final rubber strip.

The remaining processing steps were the same as those in Example 17.

Example 21

A water transporting rubber hose was produced through the following steps.

(1) Mixing: The temperature of the internal mixer was set to 95° C., and the rotor speed was set to 40 rpm. 50 parts of branched polyethylene PER-11 and 50 parts of branched polyethylene PER-5 were added, prepressed and mixed for 90 seconds. 5 parts of zinc oxide, 1 part of stearic acid, and 1 part of the anti-aging agent RD were added and mixed for 1 min. Then 30 parts of highly dispersive silica, and 15 parts of paraffin oil SUNPAR2280 were added to the rubber compound, and mixed for 3 min. Next, 5 parts of 1 mm-long aramid staple fiber was added and mixed for 2 min. Finally, 4 parts of the crosslinking agent dicumyl peroxide (DCP), 1 part of the auxiliary crosslinking agent triallyl isocyanurate (TAIC) and 0.3 part of sulfur were added, mixed for 2 min, and then discharged. The rubber compound was plasticated on an open mill, and then the sheet was unloaded and stood for 24 hrs.

(2) Extrusion molding: The rubber mix was fed to a cold feed extruder, and a rubber layer was extruded on the mandrel to obtain a hose blank. Then high-temperature steam vulcanization was performed for 25 min at a temperature of 165° C. under a steam pressure of 1 MPa. After cooling, the hose was removed from the mandrel, trimmed, inspected, and stored to obtain a rubber hose.

The superiority of the branched polyethylene in cross-linking ability is illustrated through the comparison of the crosslinking performance tests of Examples 22 and 23 and Comparative Example 3.

In Example 22, the rubber matrix comprises 100 parts of PER-2. In Example 23, the rubber matrix comprises 50 parts of PER-12 and 50 parts of EPDM (having an ML(1+4) at 125° C. of 60, an ethylene content of 55%, and an NB content of 4.8%). In Comparative Example 3, the rubber matrix comprises 100 parts of EPDM used in Example 23. The rest of the formation is the same.

The processing steps of the three rubber compositions were as follows.

The temperature of the internal mixer was set to 80° C., and the rotor speed was set to 50 rpm. The rubber matrix was added, prepressed and mixed for 90 seconds. 5 parts of zinc oxide, 1 part of stearic acid, 2 parts of the anti-aging agent RD and 5 parts of coumarone resin were added and mixed for 1 min. Then 45 parts of carbon black N330, and 5 parts of paraffin oil were added to the rubber compound, and mixed for 3 min. Next, 20 parts of 1 mm-long nylon staple fiber was added and mixed for 2 min. Finally, 4 parts of the crosslinking agent dicumyl peroxide (DCP), 1.5 part of the auxiliary crosslinking agent triallyl isocyanurate (TAIC) and 3 parts of zinc methacrylate were added, mixed for 2 min, and then discharged. The rubber compound was plasticated on an open mill, and then the sheet was unloaded and stood for 24 hrs.

The test condition includes 30 min at 175° C. The test results are shown below.

|  | Example 22 | Example 23 | Comparative Example 3 |
|---|---|---|---|
| ML, dN · m | 3.12 | 3.38 | 2.88 |
| MH, dN · m | 26.82 | 27.17 | 27.03 |
| MH − ML, dN · m | 23.70 | 23.79 | 24.15 |
| Tc90, min | 6.0 | 7.1 | 8.2 |

The rubber composition of Example 22 has the shortest Tc90 which is about 25% lower than that of Comparative Example 3, and comparable MH-ML value, indicating that the branched polyethylene used in this example is better in cross-linking ability than conventional EPDM.

What is claimed is:

1. A rubber composition comprising a rubber matrix and essential components, wherein the rubber matrix comprises, based on 100 parts by weight of the rubber matrix,
   a branched polyethylene with a content represented as A, in which 0<A≤100 parts, and
   an EPM and an EPDM with a total content represented as B, in which 0≤B<100 parts; and
   wherein, based on 100 parts by weight of the rubber matrix, the essential components comprise 1.5-9 parts of a crosslinking agent, and 5-60 parts of a staple fiber, and
   wherein the branched polyethylene comprises an ethylene homopolymer having a branching degree of from about 60 to 99 branches/1000 carbon atoms, a weight average molecular weight of from 66,000 to 518,000, and a Mooney viscosity ML (1+4) at 125° C. of from 6 to 102.

2. The rubber composition according to claim 1, wherein the ethylene homopolymer has a branching degree of from 60 to 94 branches/1000 carbon atoms.

3. The rubber composition according to claim 1, wherein the ethylene homopolymer has a branching degree of from 60 to 90 branches/1000 carbon atoms.

4. The rubber composition according to claim 1, wherein the ethylene homopolymer has a branching degree of from 60 to 87 branches/1000 carbon atoms.

5. The rubber composition according to claim 1, wherein the ethylene homopolymer has a branching degree of from 60 to 82 branches/1000 carbon atoms.

6. The rubber composition according to claim 1, wherein the ethylene homopolymer has a branching degree of from 60 to 70 branches/1000 carbon atoms.

7. The rubber composition according to claim 1, wherein the ethylene homopolymer has a branching degree of 60 branches/1000 carbon atoms, 70 branches/1000 carbon atoms, 82 branches/1000 carbon atoms, 87 branches/1000 carbon atoms, 90 branches/1000 carbon atoms, 94 branches/1000 carbon atoms, or 99 branches/1000 carbon atoms.

8. The rubber composition according to claim 1, wherein the ethylene homopolymer has a branching degree of about 60 branches/1000 carbon atoms, about 70 branches/1000 carbon atoms, about 82 branches/1000 carbon atoms, about 87 branches/1000 carbon atoms, about 90 branches/1000 carbon atoms, 94 branches/1000 carbon atoms, or 99 branches/1000 carbon atoms.

9. The rubber composition according to claim 1, wherein the crosslinking agent comprises at least one of sulfur or a peroxide crosslinking agent, wherein the peroxide crosslinking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di (tert-butylperoxy) hexane, 2,5-dimethyl-2,5-di (tert-butylperoxy) hexyne-3, bis(tert-butylperoxyisopropyl) benzene, 2,5-dimethyl-2,5-bis (benzoylperoxy) hexane, tert-butyl peroxybenzoate, and tert-butylperoxy-2-ethylhexyl carbonate.

10. The rubber composition according to claim 1, wherein the staple fiber comprises at least one of a polyamide staple fiber and an aramid staple fiber, wherein the polyamide staple fiber includes at least one of nylon 6, nylon 66 and nylon 610, and the length of the staple fiber is 1-8 mm.

11. The rubber composition according to claim 1, further comprising auxiliary components, which comprise, based on 100 parts by weight of the rubber matrix, 0.3-15 parts of an auxiliary crosslinking agent, 3-25 parts of a metal oxide, 3-90 parts of a plasticizer, 30-100 parts of a reinforcing filler, 1-3 parts of a stabilizer, 3-20 parts of a metal salt of an unsaturated carboxylic acid, and 0-4 parts of a vulcanization accelerator.

12. The rubber composition according to claim 11, wherein the auxiliary components comprise, in parts by weight, 0.5-5 parts of an auxiliary crosslinking agent, 5-20 parts of a metal oxide, 5-60 parts of a plasticizer, 40-80 parts of a reinforcing filler, 1-2 parts of a stabilizer, 5-15 parts of a metal salt of an unsaturated carboxylic acid, and 0-3 parts of a vulcanization accelerator.

13. The rubber composition according to claim 11, wherein the auxiliary crosslinking agent comprises at least one of triallyl cyanurate, triallyl isocyanurate, triallyl trimellitate, trimethylolpropane trimethacrylate, ethylene glycol dimethacrylate, N,N'-m-phenylene bismaleimide, N,N'-bis(furfurylidene) acetone, 1,2-polybutadiene, and sulfur; the metal oxide comprises at least one of zinc oxide, magnesia, and calcium oxide; the plasticizer comprises at least one of pine tar, motor oil, paraffin oil, coumarone, naphthenic oil, stearic acid, paraffin, liquid ethylene-propylene rubber, and liquid polyisobutene; the reinforcing filler comprises at least one of carbon black, calcium carbonate, calcined clay, magnesium silicate, aluminium silicate, and magnesium carbonate; the stabilizer comprises at least one of 2,2,4-trimethyl-1,2-dihydroquinoline polymer (RD), 6-ethoxy-2,2,4-trimethyl-1,2-dihydroquinoline (AW), 2-mercaptobenzimidazole (MB), and N-4(anilinophenyl) maleimide (MC); the metal salt of an unsaturated carboxylic acid includes at least one of zinc methacrylate, magnesium methacrylate, aluminum methacrylate, and calcium methacrylate; the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

14. The rubber composition according to claim 1, wherein the staple fiber is surface pretreated with a non-polar rubber.

15. A power transmission belt comprising a body with a certain length, wherein the body includes a buffer rubber layer and a compression rubber layer, and wherein the compression rubber layer comprises a rubber compound formed from the rubber composition according to claim 1.

16. The power transmission belt according to claim 15, wherein the compression rubber layer further comprises, based on 100 parts by weight of the rubber matrix, 10 to 80 parts by weight of a solid lubricant, wherein the solid lubricant comprises at least one of graphite, mica, molybdenum disulfide and polytetrafluoroethylene.

17. A conveyor belt comprising a working face cover rubber and a non-working face cover rubber, wherein at least one of the working face cover rubber and the non-working face cover rubber comprises a rubber compound formed from the rubber composition according to claim 1.

18. A rubber roller comprising a rubber compound formed from the rubber composition according to claim 1.

19. A rubber hose comprising a rubber compound formed from the rubber composition according to claim 1.

* * * * *